Figure 1:
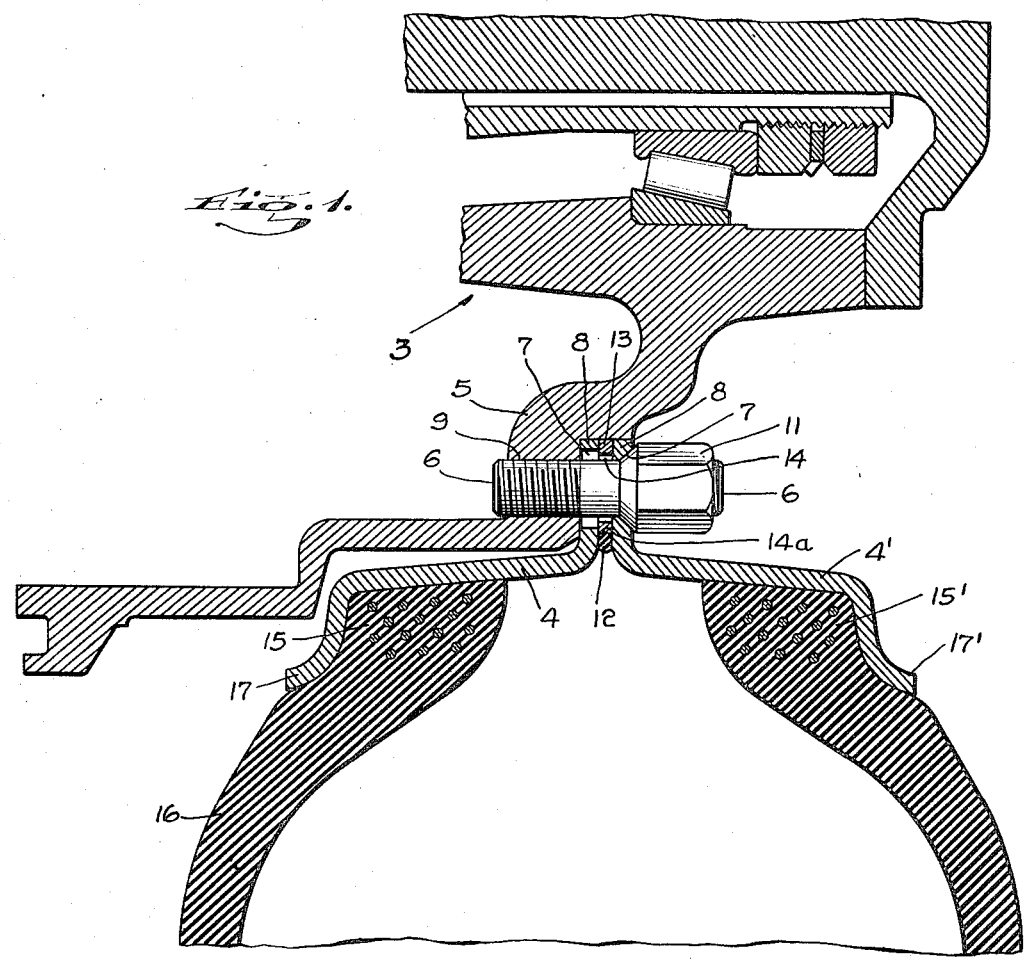

Sept. 22, 1959 G. F. QUAYLE 2,905,223
TIRE RIM ASSEMBLY
Filed Aug. 3, 1956

INVENTOR
George F. Quayle
BY H. Golden
ATTORNEY

United States Patent Office 2,905,223
Patented Sept. 22, 1959

2,905,223

TIRE RIM ASSEMBLY

George F. Quayle, Philadelphia, Pa., assignor to The Yale & Towne Manufacturing Company, Stamford, Conn., a corporation of Connecticut Application August 3, 1956, Serial No. 601,922

4 Claims. (Cl. 152—404)

This invention relates to tire rim assemblies, and relates more particularly to a novel tire rim assembly for use in industrial trucks.

As those skilled in the art will fully appreciate, tire rims for industrial trucks are made of such size as to provide for a compact wheel assembly with the brake drums, the bearings and other essential elements. This is a normal feature of industrial truck design as such trucks must be of the smallest size possible in order to make them of maximum maneuverability in the relatively small, and often work-crowded, factory and warehouse aisles.

Tire rims are generally formed of one piece with opposed flanges on the peripheries thereof and a deep central drop portion or depression therebetween. The central depression is necessary to allow for movement thereinto of one bead of a tire while the other bead is manipulated into position against a flange of the rim. Thereafter the bead is lifted from the depression into position against the other flange. Inflating the tire causes both beads of the tire to be forced into close contact with the inside of the flanges of the rim. This particular type of tire rim cannot be used on an industrial truck because of space limitations, the drop in the central portion of the rim taking considerable space. Accordingly, industrial trucks are currently equipped with rims formed of two complementary parts joined by a series of bolts passing through suitable openings formed in an annular rib integral with the inner periphery of each rim component, the assembly of the two rim components by the bolts yielding a final rim that will hold in place a conventional tire. This type of rim is quite effective in this particular art since it enables a small tire to be used and it simplifies the mounting thereof on the rim. Thus, in mounting the tire on the rim, the rim components are loosened or separated, and the tire is positioned with one bead thereof against the flange of one of the rim components, after which the flange of the other component is placed against the other tire bead and the tire rim components bolted together.

My invention relates to means whereby the two component rim just described may be utilized for tubeless tires. As a particular feature of my invention, I have provided an effective construction whereby a sealing means may be so hold in predetermined position as not to be deformed incidental to the assembly of the rim components, and also so as not to yield to the high air pressure within the inflated tire. The basic concept of my invention involves the utilization of an annular spacer of metal or other suitable material which acts as a backing or reinforcing member for holding in place the sealing material so that it will not flow or move out of position. As sealing material, I use any suitable natural or synthetic elastomeric material. Preferably, I utilize for sealing, a rubber ring that may take the form of an O-ring.

As a feature of my invention, I assemble the two complementary rim components, placing between said rim components a ring of sealing material and concentrically with said ring a spacer, the construction and arrangement being such that the spacer not only holds the rim components apart a distance sufficient to form a pocket for said sealing material, but also contributes a backing or reinforcing surface for the sealing material or O-ring where an O-ring is utilized.

As a more particular feature of my invention, the spacer may take the form of a thin metal annulus assembled between the two ribs of the complementary rim components. In another aspect of my invention, the annulus may be eliminated as a separate member but its function may be supplied by forming an integral shoulder or similar member on the rib of one of the rim components. The shoulder, in effect, would perform the same backing or reinforcing function that would be contributed were the backing or reinforcing metal annulus to be welded to a rib of one of the rim components.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, Fig. 1 is a partial sectional view showing the sealing material, and the backing and reinforcing spacer of my invention in position on a rim fixed to the hub of a wheel.

Figure 2:
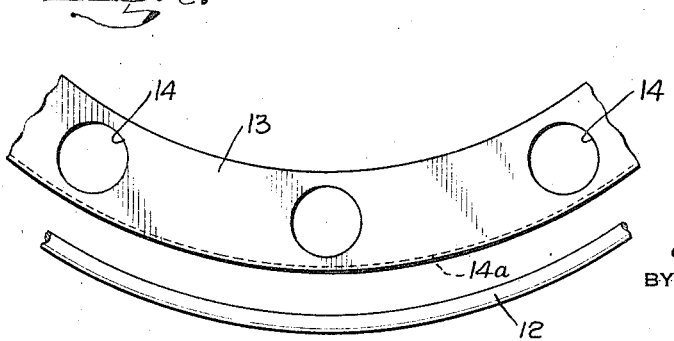

Fig. 2 is a detail view of a portion of the O-ring and spacer.

Referring now more particularly to the drawings, reference numeral 3 indicates generally a wheel structure such as is employed on industrial trucks. In such wheel structures the two complementary rim components 4 and 4' of the rim are attached to the hub 5 of the wheel structure by a series of screw bolts 6 passing through aligned openings 7 in ribs 8 of the rim components and into threaded apertures 9 in said hub 5, a nut 11 holding the rim components together on said screw bolts 6.

In accordance with my invention, I mount between the ribs 8 of the rim components a thin metal annulus or ring 13 provided with a series of openings 14 so spaced as to be aligned with openings 7 in ribs 8. By this assembly of the ring 13 to the rim components, the ring is held in a position in which it acts as a backing or reinforcing member for a sealing element or O-ring 12. Thus, ring 13 is formed with a concave peripheral surface 14a coacting with sealing element or O-ring 12 and holding the O-ring so that it will not be forced out of position by the air pressure of the inflated tire. Moreover, the ring 13 acts as a spacer to prevent the sealing member from being deformed by the pressure of the ribs when the complementary rim components 4 are assembled.

The tire 15 may be mounted on the wheel structure in the following manner. One of the complementary rim components, i.e. rim component 4, is positioned on screw bolts 6 which pass through the openings 7 in the rib 8. The metal annulus 13 is then placed on screw bolts 6 through openings 14 in said annulus, and the O-ring 12 is positioned concentrically on the surface 14a of said annulus. The bead 15 of tire 16 is now positioned against the inside of flange 17 of rim component 4 and the rim component 4' is then placed in position on screw bolts 6 through the openings 7 in rib 8 whereby the flange 17' comes into contact with the other bead 15' of the tire. The nuts 11 are then tightened forcing the rim components together to hold the tire in position thereon, the spacer preventing the ribs of the rim components from deforming the O-ring. After the tire is in position, it is inflated causing the beads to be fixed more firmly against the flanges of the rim components which prevents air from escaping. The O-ring is also pressed against the surfaces of the ribs 8 which prevents air from escaping between the rim components, the spacer here functioning as a backing or reinforcing surface whereby the O-ring sealing element is prevented from being distorted in a radial direction.

I believe that the construction and operation of my novel tire rim assembly will now be clearly understood, and that its very considerable merit will be fully appreciated by those skilled in the art.

I now claim:

1. A tire rim assembly of the class described comprising a pair of complementary circular rim components, each having an outwardly extending flange at one edge thereof for cooperation with a bead of a tire and an inwardly projecting rib at the other edge thereof whereby said rim components may be assembled as by bolts passing through a series of aligned holes in said ribs when said ribs are juxtaposed, an annular spacer secured in contact with surfaces of said ribs between said ribs to form with said rim components a rigid tire rim when said components are assembled, said annular spacer having a peripheral surface forming with portions of said rib surfaces a shallow depression, and a yielding elastomeric sealing material positioned between said ribs in said shallow depression and against the peripheral surface of said spacer to present a seal against the escape of air from an inflated tubeless tire mounted on said rim assembly.

2. A tire rim assembly of the class described comprising a pair of complementary circular rim components, each having an outwardly extending flange at one edge thereof for cooperation with a bead of a tire and an inwardly projecting rib at the other edge thereof whereby said rim components may be assembled as by bolts passing through a series of aligned holes in said ribs when said ribs are juxtaposed, an annular spacer secured in contact with surfaces of said ribs between said ribs to form with said rim components a rigid tire rim when said components are assembled, said annular spacer having a peripheral surface forming with portions of said rib surfaces a shallow depression, and a yielding rubber ring positioned between said ribs in said shallow depression and against the peripheral surface of said spacer to present a seal against the escape of air from an inflated tubeless tire mounted on said rim assembly.

3. A tire rim assembly of the class described comprising a pair of complementary circular rim components, each having an outwardly extending flange at one edge thereof for cooperation with a bead of a tire and an inwardly projecting rib at the other edge thereof whereby said rim components may be assembled as by bolts passing through a series of aligned holes in said ribs when said ribs are juxtaposed, an annular spacer having holes in aligned relation to the holes in said ribs, said annular spacer secured in contact with surfaces of said ribs between said ribs adjacent an inner zone thereof to form with said rim components a rigid tire rim when said components are assembled, said annular spacer having a peripheral surface forming with portions of said rib surfaces a shallow outwardly opening depression, and a yielding rubber O-ring positioned between said ribs in said shallow depression and bearing against the peripheral surface of said spacer to present a seal against the escape of air from an inflated tubeless tire mounted on said rim assembly.

4. A tire rim assembly of the class described comprising a pair of complementary circular rim components, each having an outwardly extending flange at one edge thereof for cooperation with a bead of a tire and an inwardly projecting rib at the other edge thereof whereby said rim components may be assembled as by bolts passing through a series of aligned holes in said ribs when said ribs are juxtaposed, a thin metal ring secured in contact with surfaces of said ribs between said ribs adjacent an inner zone thereof to form with said rim components a rigid tire rim when said components are assembled, said ring having a concave outer periphery, and a yielding rubber ring positioned between said ribs and against the concave outer periphery of said spacer to present a seal against the escape of air from an inflated tubeless tire mounted on said rim assembly.

References Cited in the file of this patent

UNITED STATES PATENTS

| | | |
|---|---|---|
| 1,023,454 | Black | Apr. 16, 1912 |
| 2,396,005 | Gross et al. | Mar. 5, 1946 |
| 2,789,847 | Jackson | Apr. 23, 1957 |

FOREIGN PATENTS

| | | |
|---|---|---|
| 2,242 | Great Britain | of 1853 |
| 3,568 | Great Britain | of 1895 |
| 1,119,296 | France | Apr. 3, 1956 |